United States Patent
Suresh

(10) Patent No.: US 8,626,818 B2
(45) Date of Patent: Jan. 7, 2014

(54) SYSTEM AND METHOD FOR GENERATING USER CONTEXTS FOR TARGETED ADVERTISING

(75) Inventor: Narasimha Suresh, Karnataka (IN)

(73) Assignee: Telibrahma Convergent Communications Pvt Ltd, Bangalore (IN)

( * ) Notice: Subject to any disclaimer, the term of this patent is extended or adjusted under 35 U.S.C. 154(b) by 1477 days.

(21) Appl. No.: 11/734,302

(22) Filed: Apr. 12, 2007

(65) Prior Publication Data
US 2008/0034088 A1 Feb. 7, 2008

(30) Foreign Application Priority Data
Aug. 3, 2006 (IN) .............................. 1376/CHE/2006

(51) Int. Cl.
*G06F 15/16* (2006.01)
*G06Q 10/00* (2012.01)
*H04M 3/00* (2006.01)

(52) U.S. Cl.
USPC .......................... 709/201; 705/7.29; 455/418

(58) Field of Classification Search
USPC ............................... 709/201; 705/14; 455/418
See application file for complete search history.

(56) References Cited

U.S. PATENT DOCUMENTS

| | | | |
|---|---|---|---|
| 6,571,279 B1 * | 5/2003 | Herz et al. | 709/217 |
| 2003/0093311 A1 * | 5/2003 | Knowlson | 705/10 |
| 2003/0126146 A1 * | 7/2003 | Van Der Riet | 707/100 |
| 2005/0080665 A1 * | 4/2005 | Bowman-Amuah | 705/14 |
| 2006/0149633 A1 * | 7/2006 | Voisin et al. | 705/14 |

* cited by examiner

*Primary Examiner* — Ranodhi Serrao
(74) *Attorney, Agent, or Firm* — Lowe Hauptman & Ham, LLP

(57) ABSTRACT

The invention provides a method and system for building contexts for mobile users by collecting information about the user and his activities through various end points of a network and also through a system specific application that transmit information to a centralized server for context generation and filtering. The contexts thus generated are analyzed statistically for utility and based on the utility, the contexts are used for sending targeted advertisements.

8 Claims, 3 Drawing Sheets

SYSTEM AND METHOD FOR GENERATING USER CONTEXTS FOR TARGETED ADVERTISING

RELATED APPLICATIONS

The present application is based on, and claims priority from, IN Application Number 1376/CHE/2006, filed Aug. 3, 2006, the disclosure of which is hereby incorporated by reference herein in its entirety.

FIELD OF THE INVENTION

The present Invention relates to mobile user context generation. More particularly the present invention relates to a model and framework for generating and exploiting mobile user contexts for context sensitive advertising.

BACKGROUND AND PRIOR ART

The common channels used for advertising are television, internet, and mobile among others. Various advertising methods are being used to make it more efficient.

With the rapid growth of telecommunications worldwide, mobile commerce has become a reality. Mobile communication has also become an important channel for marketing various services. Over past few years, email messages have been used to market services. Service providers obtain the email ids from various sources including other service providers in various domains who have access to information of their customers. Similarly, mobile devices being common today, various service providers having access to mobile contact information of their customers can potentially share such information with other marketing agencies or service providers who would want to market their services. However, privacy concerns attached to such sharing of mobile contact information is much more than it is to email id. At the same time, in order to market services, subscribers to such mobile contact information are also not guaranteed of their success through such sending campaigns to any available mobile contact information and they need to make sure that their advertisements are reaching the right audience by ensuring that the audience to which they are sending messages belong to a context related to the marketing effort.

Therefore, it is important to determine the advertisements that the user would be most receptive to ensuring that advertisements are not treated as spam and intruding in to users privacy. This requires determination of context. Determining the exact context is complex as there are multiple dimensions to it. Context is a dynamically changing phenomena and normally is quite ambiguous and subjective.

Attempts have been made to create a framework for delivering context sensitive advertisements. US patent application 20050080665A1 describes a context sensitive advertisement delivery framework where the specific advertisements are transmitted to the mobile wireless device. In this patent application an identifier associated with the mobile device and the state and location of the mobile device is ascertained after receiving a signal from the device. A context engine is used to update the profile database by using the gathered information. The location of the mobile is associated with a landmark in the profile database; the advertisements are then transmitted to the mobile device by selecting the advertisements from the advertisement database by utilizing the context engine based on identifier, state, location, and landmark of the mobile wireless. The patent application does not facilitate the user to choose the advertisement according to personal preferences.

However, contexts being dynamic, tracing an a wireless mobile device using a identifier and the location of the device is not sufficient. Current system provides a new model for determining such contexts. System proposes having mechanisms to allow user to interact with the system at multiple network end points. These interactions along with location of the mobile phone, user profile and statistical modelling (based on the interaction patterns of other users) it would be possible to create set of contexts with detailed parameters. Based on the determined context a targeted communication can be determined that will be effective.

SUMMARY OF THE INVENTION

The primary object of the present invention is to generate the context information of the user so as to facilitate context sensitive advertising on mobile devices.

Another object of the present invention is to encourage the user of the mobile device to participate in the system so as to generate user contexts based on interactions of users and location of users at multiple end points of a network.

Another object of the invention is to combine the different actions to create a context of the user based on the statistical analysis of interactions of other users.

Another object of the invention is to provide a method where context sensitive advertising is enabled without compromising on the privacy of users by providing users with a system specific application and informing the client that information will be transferred about user and his activities for presenting client with context sensitive advertisements and therefore making the advertising permission based.

Accordingly, the present invention provides a method and a system of generating plurality of user contexts by encouraging users to participate in the system through different end points and combining these actions at the plurality of end points to create a context for a user.

In one aspect, the present invention provides a method where user when engaging in multiple actions at different end points, the information of the actions being involved in is registered at a central server. Along with the information about actions, the location of the user is also tracked either through the end points that he/she is engaging with or by locating the user's mobile phone while he performs his actions. Also, various interactions of the user with the system through other means including interacting with a system through a handheld (through various applications specific to the system) for a multitude of purposes are tracked and information is collected. The actions are categorized in to pre-defined business event categories. Business events that the user is engaging in along with other parameters including user information and location information are mapped using a set of rules to determine one or more context. All such contexts with a given statistical confidence would be used as targets for sending targeted advertisements. Contexts could be mapped to an advertisement based on pre-defined rules.

In another aspect, the present invention provides a system. The system comprises of a handheld device for a user to interact with the system; a plurality of endpoints for users to interact; a centralized server for collecting information on all the events registered on any of the plurality of end points; a context filtering interface to determine the right context based on the events for which information is collected; and a rule engine to analyze the confidence level of each of such contexts to determine the usefulness of a context for sending advertisements.

In another aspect of the system, the user downloads a specific application onto this handheld device. The application downloaded enables a user to interact with the system through various sub-applications. This allows the system to collect information about user's activities on the handheld device specific to the application. The user is aware that the application transmits information about the user and his activities through the application downloaded to build his context and present context sensitive advertisements and thereby making the system permission based system that enables targeted advertising to mobile users.

In a preferred embodiment of the present invention, the aforementioned system is a combination of hardware and software.

Further objects, features and advantages will become apparent from the following description, claims and drawings.

BRIEF DESCRIPTION OF THE DRAWINGS

The above aspects of the invention are described in detail with reference to the attached drawings, where.

DETAILED DESCRIPTION OF THE INVENTION

Figure 1:
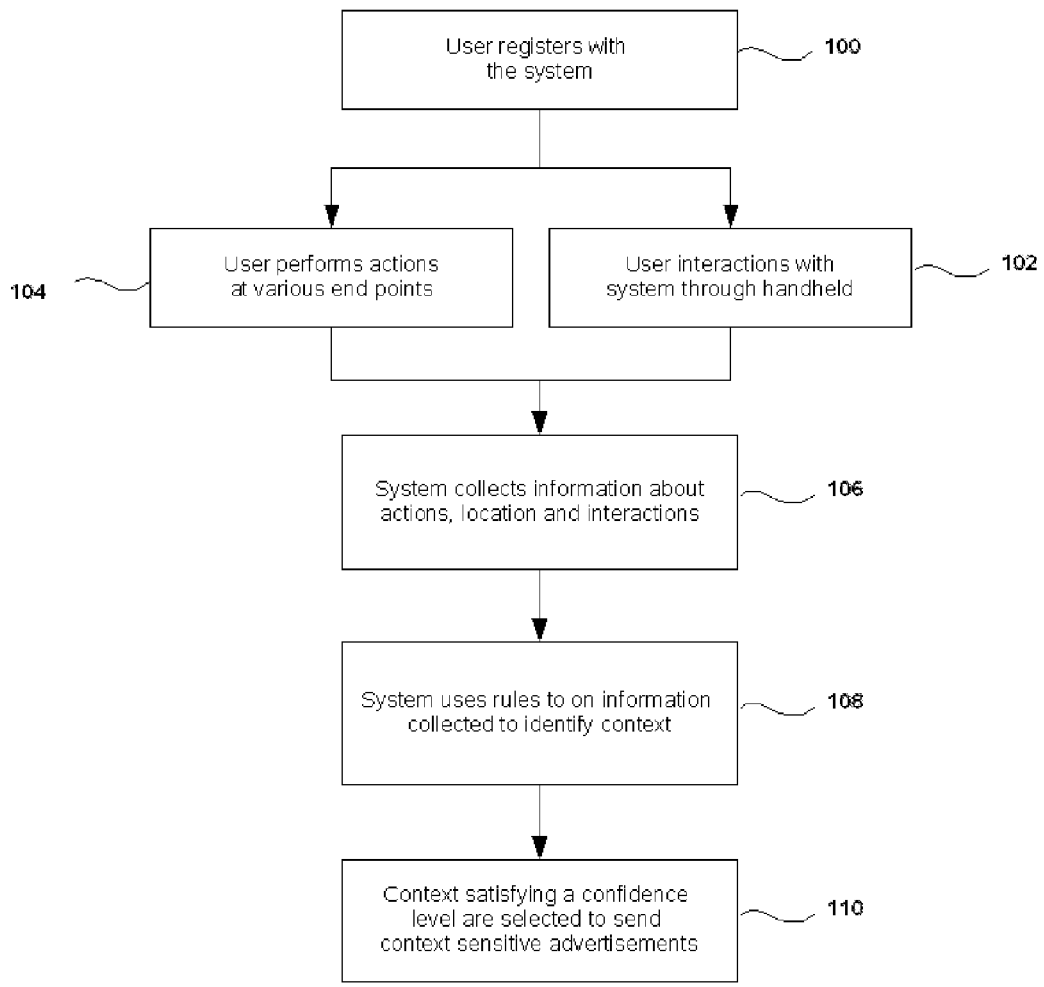
FIG. 1 shows an embodiment of the method of the invention.

FIG. 1 shows the method of the invention. According to the method of the invention users register with a system (100). A user when engaging in multiple actions at different end points (104), the information of the actions that the user is involved in is registered at a central server (106). Along with the information about actions, the location of the user is also tracked either through the end points that engaging with or by locating the user's mobile phone while he performs his actions. Also, various interactions of the user with the system through other means including interacting with a system through a handheld (through various applications specific to the system downloaded on to the handheld) for a multitude of purposes are tracked and information is collected (102). The actions are categorized in to pre-defined business event categories. Actions along with other parameters including user information and location information are mapped using a set of rules to determine one or more context. The rules are derived through statistical analysis of various actions of other users and the advertisements that such users used. All such contexts with a pre-defined minimum statistical confidence (or correlation) would be used as targets for sending promotions (110). Contexts could be mapped to a promotion/message based on pre-defined rules.

In various embodiments, users engage with multiple end points through different mechanisms including but not limited to P2P messaging, downloading information (data, audio, visual) on to mobile device, performing certain actions (like buying a ticket). Examples of interaction include users using the client downloaded to his handheld for searching information, buying ticket, downloading coupon etc; users sending message to query for a particular information; users using the client downloaded to engage in communications with his peers (Chat, blog); users using the downloaded ticket in a point of entry; and users using the downloaded coupon near a POS.

Figure 2:
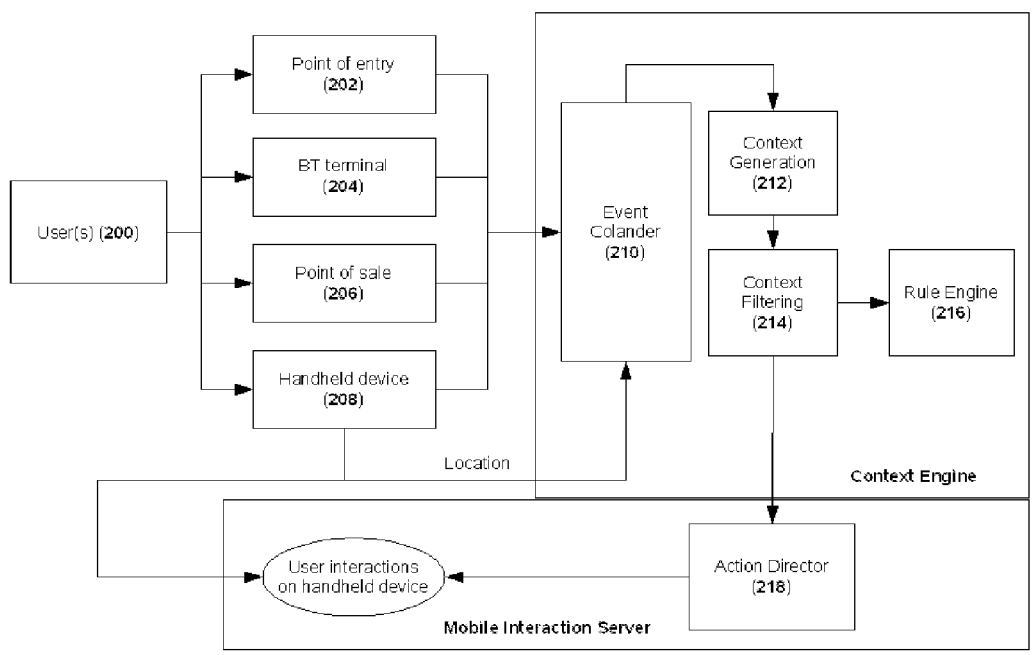
FIG. 2 shows the block diagram of the system of the invention.

FIG. 2 shows the logical view of the system with the various components within the system. The system comprises of a handheld device (208) for a user to interact with the system; a plurality of endpoints for users to interact (202, 204, 206); and a centralized server for collecting information on all the events registered on any of the plurality of end points comprising a context engine and a mobile interaction server.

The context engine comprises of an event colander (210); a context generation module (212); a context filtering interface (214) to determine the right context based on the events for which information is collected; and a rule engine (216) to analyze the confidence level of each of such contexts to determine the usefulness of the context for sending promotions based on correlation analysis of interactions of users and usefulness of advertisements pushed to their mobile devices using the system specific application. The context generation module collects event information from the event colander and forwards the context related information including the event information, user profile, user location information etc. to the context filtering interface. The context filtering interface utilizes the rule engine to map user activities into set of event and the set of events to a context. The rule engine uses the information forwarded to perform correlation analysis between similar actions/events (ex: action could be enquiring for availability of movie tickets and an event could watching a movie) and the kind of advertisements that they have accessed/viewed. Based on the information collected and the correlation history, the rule engine suggests appropriate contexts. The mobile interaction server of the centralized server comprises of an action director (218) to direct behaviour of the application on the handheld device according to the interactions of the user. Based on the contexts built, action director (218) could be used to forward relevant advertisements or messages that could be useful to the users. The action director itself might contain another rule engine to map contexts to advertisements based on a bidding mechanism or any other such mechanism.

In various embodiments, a collection of endpoints (where the user interactions are targeted at) may include Those situated in various geographical locations with which user can interact (Blue tooth terminals)

Those are connected over internet for user to interact over GPRS/SMS and similar networks Point of sales, point of entry and similar terminals where user can interact for the purpose of payment, collection, redeeming coupons etc.

Actions or interactions that a user is involved in at the end points could include and is not limited to the following:

User using a promotional key at a point of sale terminal

User paying for certial type of goods at a point of sale terminal

User withdrawing money from ATM and filling petrol

User withdrawing money from ATM and parking his car at a identified place

User withdrawing money from ATM and using his mobile ticket at an identified point of entrée User interacting with various applications on his handheld device like:
        searching for a given services in a particular area
        using the application in a given area
        downloading a given type of content
        engaging in chatting with old friends
        engaging in public room chat
        searching for people to chat Using the information collected about the user, his profile and his activities, the context engine builds a context that could be used to send advertisements of companies that would be interested in advertising to users belong to such contexts. The contexts built are stored on the centralized server either in a database or any other physical memory on the server.

An example of the data structure of a context built and stored is as follows:

| | |
|---|---|
| User Identification | User Id/Mobile number |
| Mobile type | Endpoint interaction id |
| | Transaction parameters |
| | Time of event |
| User Profile | User Id/Mobile number |
| | Age group |
| | Spending type |
| | Income group |
| | User since |
| | Last accessed |
| | Interaction domains (Sports/music/movie) |
| | Opt-in for advertisements |
| User History | User Id |
| | Endpoint Id |
| | Promotion Id |
| | Level of interaction from the user |
| Location Information | User Id/Mobile number |
| | Location Id |
| Endpoint Interactions | Endpoint Interaction Id |
| | Endpoint Id |
| | Location Id |
| | Transaction type |

Examples of context that the context engine can identify could include and is not limited to the following:

User is available near a Bluetooth terminal and the user downloaded a specific content User is available near a Bluetooth terminal and the user interacted with the terminal User is involved in a terminal specific event (ex: asking for specific information like information about movies at a cinema; doing specific transactions like buying tickets for a movie at a cinema)

The process for building and filtering a context includes an algorithm for building weighed average table to determine optimal promotion. Broadly, the algorithm involves the following steps:

Collecting the event

Identifying user behaviour for a set of same endpoint interactions

Identifying user behaviour with similar endpoints

Identifying summary of interactions with other similar users related to a particular endpoint Preparing a wighted average of relevant responses in a table Upon collecting information on events and user behaviours for different scenarios, value estimation is done for each user based on value generated by the user through previous promotions. A table is generated with data of value generated by users in different scenarios and the table is used to determine optimal promotion when a promotion needs to be sent.

The system of the invention allows a user to download a specific application onto his handheld device. The application downloaded enables a user to interact with the system through various sub-applications. This allows the system to collect information about user's activities on the handheld device specific to the application and the user is aware that the application transmits information about the user and his activities to build his context and present context sensitive advertisements on his device through the application downloaded and therefore making the advertising permission based.

Figure 3:
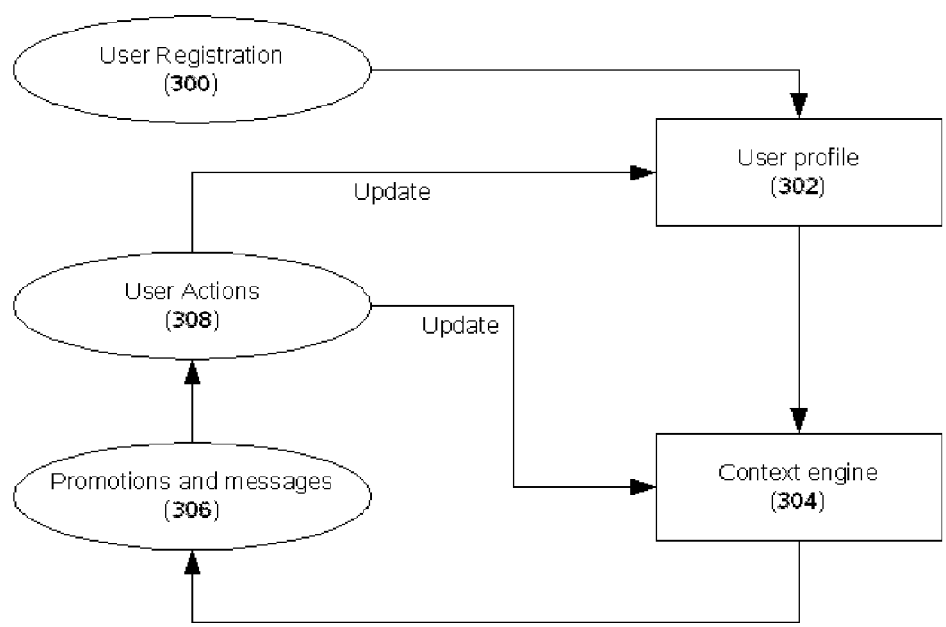
FIG. 3 shows the interactions between various elements of the system to update user profile and context.

FIG. 3 shows how the system updates itself to build a context based on various activities. An initial user profile is generated upon user registration (300). And based on the user profile (302) and user actions (308) (at the end points and at the application on handheld), the context engine (304) builds a context. The context built by the context engine (304) is used to send context sensitive advertisements (306). Based on further user actions, the user profile and the user context is updated to accommodate the most recent behaviour in to the context.

In a preferred embodiment of the present invention, the aforementioned system is a combination of hardware and software.

Although the present invention has been described with particular reference to specific examples, variations and modifications of the present invention can be effected within the spirit and scope of the following claims.

What is claimed is:

1. A method of generating user contexts, to enable context sensitive advertising, by encouraging users of a system to participate through different end points of the system and using information of user actions, information of user profile and information of user location to generate context, the method comprising:

storing information about a plurality of users and their profiles at a central server by the system;

allowing the users to engage in actions through a respective communication device at a plurality of end points of the system;

registering information of the actions and the location of the actions performed by the users through the communication device at the central server;

categorizing each of the actions in to at least one predefined business event information based on user behavior;

generating contexts of the users by combining their profile information with the business event information; and choosing appropriate contexts by filtering the generated contexts based on a statistical analysis of previous history of the actions by users.

2. The method as claimed in claim 1, wherein the location of the user is tracked by the system through the end points that users engage with.

3. The method as claimed in claim 1, wherein the location of the user is tracked by the system by locating a device used by users while users perform the actions.

4. The method as claimed in claim 1, wherein the steps of generating and choosing appropriate contexts by filtering the generated contexts further comprises collecting the business event information;

identifying user behavior for a set of same endpoint interactions;

identifying user behavior with similar endpoints;

identifying summary of interactions of other users having similar profiles as that of the user for a particular endpoint; and preparing a weighted average of responses of the users in different scenarios in a table to identify effectiveness of promotions for a given set of profiles, locations, and business events.

5. The method as claimed in claim 1, wherein an initial user profile is generated by the system upon user registration.

6. The method as claimed in claim 1, wherein the user profile and the user context are updated by the system by tracking user actions to accommodate a most recent behavior in to the context.

7. The method as claimed in claim 1, wherein the steps of generating contexts includes generating contexts of a user based on an analysis of actions of other users.

8. The method as claimed in claim 1, wherein the step of allowing the users to engage in actions through a respective communication device at a plurality of end points of the system further comprises allowing each of the users to engage in the actions with different endpoints at different time instance.

* * * * *